(12) United States Patent
Hajto et al.

(10) Patent No.: US 7,495,384 B2
(45) Date of Patent: Feb. 24, 2009

(54) DISPLAY COMPRISING A FLUORESCENT DYE DOPED POLYMER

(75) Inventors: Janos Peter Hajto, Edinburgh (GB); Colin Stuart Hindle, Edinburgh (GB); Brendan Thomas McGuckin, Falkirk (GB)

(73) Assignee: Freelight Systems Limited, Edinburgh (GB)

( * ) Notice: Subject to any disclaimer, the term of this patent is extended or adjusted under 35 U.S.C. 154(b) by 682 days.

(21) Appl. No.: 10/362,806

(22) PCT Filed: Aug. 29, 2001

(86) PCT No.: PCT/GB01/03844

§ 371 (c)(1),
(2), (4) Date: Jun. 11, 2003

(87) PCT Pub. No.: WO02/19020

PCT Pub. Date: Mar. 7, 2002

(65) Prior Publication Data

US 2004/0100432 A1    May 27, 2004

(30) Foreign Application Priority Data

Aug. 29, 2000 (GB) ............................ 00211169
Feb. 16, 2001 (GB) ............................ 01038553

(51) Int. Cl.
*G02F 1/13357* (2006.01)
*H05B 33/00* (2006.01)

(52) U.S. Cl. .................. 313/504; 313/512; 362/800; 428/917

(58) Field of Classification Search .......... 313/503–506
See application file for complete search history.

(56) References Cited

U.S. PATENT DOCUMENTS

| 4,142,781 | A | 3/1979 | Baur et al. ............... 350/345 |
| 4,298,802 | A | 11/1981 | Quella et al. ............. 250/484 |
| 5,815,228 | A | 9/1998 | Flynn ....................... 349/71 |
| 6,765,348 | B2 * | 7/2004 | Aziz et al. ................ 313/504 |
| 2004/0027062 | A1 * | 2/2004 | Shiang et al. ............. 313/506 |

FOREIGN PATENT DOCUMENTS

| DE | 2554226 | 6/1977 |
| EP | 0646830 | 4/1995 |
| FR | 2573232 | 5/1986 |
| GB | 2186147 | 8/1987 |
| WO | 9527920 | 10/1995 |
| WO | 9740416 | 10/1997 |
| WO | 0014598 | 3/2000 |

OTHER PUBLICATIONS

Crossland W. A. et al., Proceedings of the SPIE, SPIE, Bellingham, VA, US, vol. 3955, Jan. 27, 2000, pp. 70-83.

* cited by examiner

*Primary Examiner*—Ashok Patel
(74) *Attorney, Agent, or Firm*—Daniel A. Monaco; Drinker Biddle & Reath LLP

(57) ABSTRACT

The present invention provides a dynamic high resolution color display. In particular a display comprising a plurality of pixels composed of a fluorescent dye doped polymer material is provided. Specifically said pixels are applied to a suitable base substrate and further modulated, such that a moving image can be produced by the display. The present invention further provides a variety of pixel elements which may be used to produce static display signs, or further combined with a phosphorescent material to act as a backlight for an LCD or other similar display. In all cases the displays of the present invention have no, or a greatly reduced direct energy consumption.

6 Claims, 3 Drawing Sheets

DISPLAY COMPRISING A FLUORESCENT DYE DOPED POLYMER

DISPLAY

The present invention provides a dynamic high resolution colour display. More specifically a full colour display is provided which is constructed of unique fluorescent dye-doped polymer materials.

The displays industry is currently a multi-billion dollar market. Typical display devices are very familiar and in everyday use, for example cathode ray tubes (CRT) as used in televisions or computer monitors, and liquid crystal electro-fluorescent backlit (LCD) devices as used in mobile phones or handheld electronic organisers as well as in many other applications.

These display types have many limitations including their restricted field of view, poor visibility in high ambient light conditions such as outdoors and high power consumption.

Further, UK Industry will face an increase in energy costs due to the introduction of the government's climate change levy (energy tax). It is an object of the present invention to overcome the limitations of the display identified in the prior art and provide a full colour display, which does not require a direct energy source.

According to the present invention there is provided a dynamic high resolution colour display, said display comprising a plurality of pixels composed of at least one fluorescent dye doped polymer material, applied to a base substrate, wherein the pixels are modulated to effect the production of images by the display.

Preferably modulation of the pixels is effected by an electrochemical means, a liquid crystal means or by any other suitable technique.

Preferably where the modulation is effected by a liquid crystal means, the modulator is a bistable ferroelectric liquid crystal modulator, or a nematic liquid crystal modulator.

Preferably the modulator is located in front of the pixel array.

Alternatively the modulator is located behind the pixel array.

Preferably the pixels are from 10 microns to 100 mm in diameter.

The diameter of the pixel will be dictated by the type of display, for example a high resolution display for a laptop computer will have a small pixel, whereas a pixel for use in a low resolution display board would be of a much greater diameter.

Preferably the pixels are formed from dots of fluorescent dye doped polymers applied to the substrate.

Preferably the dots of fluorescent dye doped polymer are applied to the base substrate by means of ink jet printing.

Alternatively the dots of fluorescent dye doped polymer are applied to the base substrate by means of screen printing or multi-shot moulding.

Preferably the pixels may also be microlenses.

Preferably the microlenses can be single or multi-shot moulded.

Preferably the microlenses are applied to the base substrate by single or multi-shot moulding.

Preferably the base substrate is selected from the group comprising polymer, quartz or glass.

Preferably the light to pump the fluorescent dye contained within the pixels can be coupled through the substrate.

Preferably the fluorescent dyes contained within the polymer are pumped by a wavelength matched, mercury free illumination source, such as an LED which emits blue or ultraviolet light.

Preferably the dye doped polymer material is organic fluorescent material.

Essentially the display will not require any mosaic filters as the light generation of specific wavelengths over narrow emission bands by each individual pixel via direct excitation of each dye-doped pixel by an illumination source obviates the need for mosaic filters.

A further aspect of the present invention provides a static colour display, said display being comprised of display pixels or "dots" of a fluorescent dye doped polymer material being applied to a substrate, said base substrate having light guided structure and being an integral part of the display.

Preferably the dots of fluorescent dye doped polymer are applied to the substrate by means of ink jet printing.

Alternatively the dots of fluorescent dye doped polymer are applied to the substrate by means of screen printing.

In the case where the preferred substrate is a polymeric material, the dots of fluorescent dye doped polymer pixels could be created by multi-shot moulding of the pixels into or onto the preferred substrate.

Preferably the substrate is a polymer with wave guide function, quartz, glass or translucent paper, such as tracing paper.

Preferably the fluorescent dye material is organic.

A further aspect of the present invention provides a back-lighting or other static lighting source for use in the illumination of a display, such as an LCD display for a mobile phone, the back-lighting source containing a fluorescent dye doped polymer material and a phosphorescent material, said phosphorescent material being modulated such that the release of light therefrom can be controlled.

A yet further embodiment of the present invention provides a pixel, which can be used in the production of an active or static image, the pixel containing both phosphorescent and fluorescent material.

Preferably the pixels are from 10 microns to 100 mm in diameter.

Preferably the phosphorescent material is an inorganic pigment.

A further aspect of the present invention provides a static display comprising an array of optical pixel elements, said pixel elements being composed of a polymer doped with fluorescent dye molecules.

Typically, the organic fluorescent molecules are chosen from the compounds including aromatic hydrocarbons and aromatic heterocarbons, such as coumarin family, oxizole family, perylene family, pyronin family, quinoline family and stilbene family.

Typically, the phosphorescent material is chosen from the groups comprising zinc sulphides, or alkaline earth aluminates.

In the present description, a pixel is taken to be a picture element, i.e. one of a number of units which when viewed in combination with other pixels produces an image.

An embodiment of the present invention is now described, by way of example only, with reference to the accompanying drawings in which;

FIG. 1 shows a display consisting of a plurality of pixels comprised of fluorscent dye doped polymer material applied to a base substrate, the emission of light by the pixel being selectively modulated by a liquid crystal modulator located between the base substrate and the pixels, and wherein the display is back-lit by blue or ultraviolet light.

The backlight could be either a cold-cathode fluorescent tube (CCFT) or LED.

Figure 1:
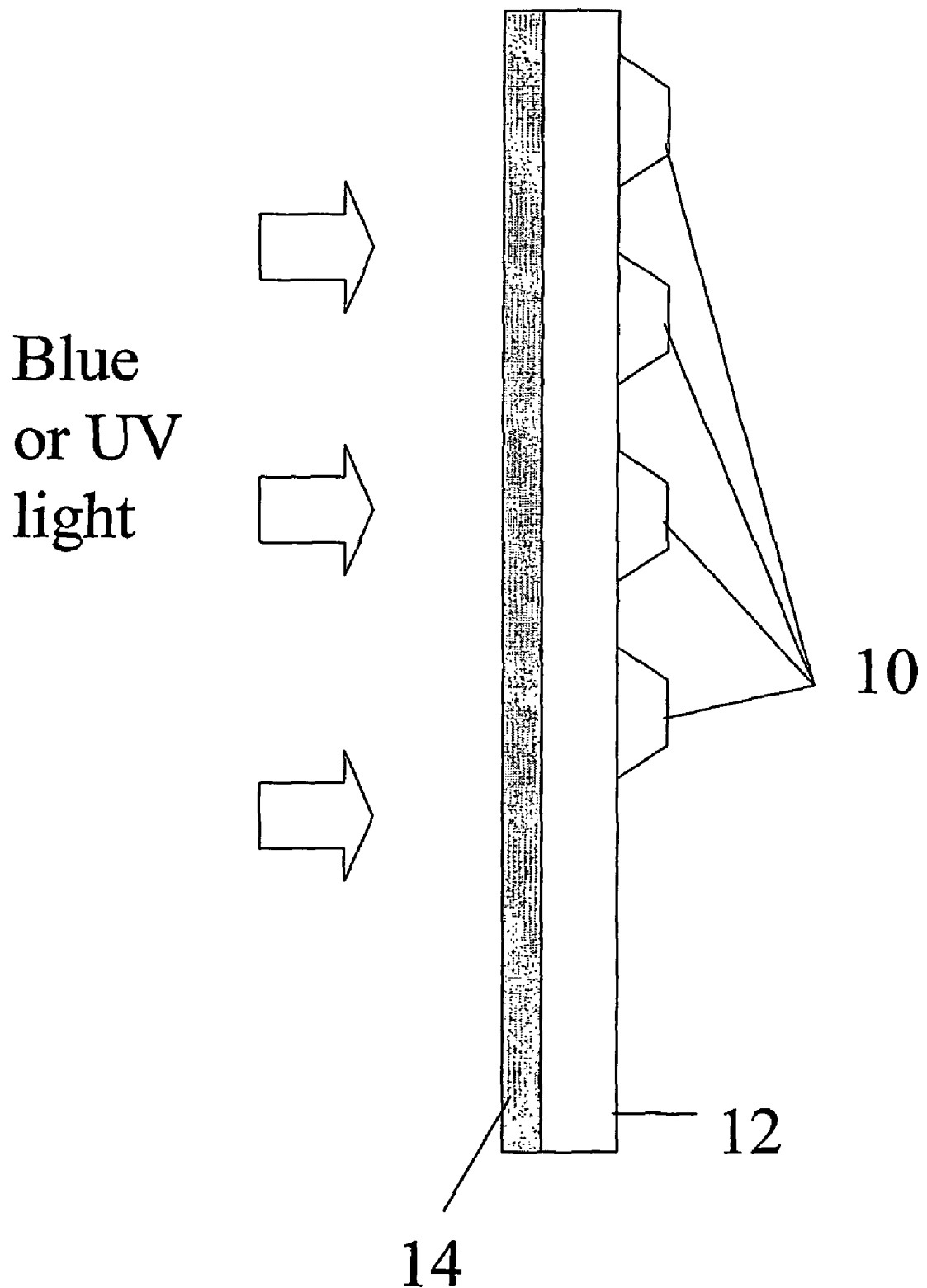

Considering the display shown in FIG. 1 in more detail, a plurality of pixels 10 of a dye doped polymer material are applied to a base substrate 12. The base substrate 12 in this case is a transparent polymer material. A pump source 20 applies light at a specific location at the back of the display.

Preferably this back lighting is blue or ultraviolet light.

This pump light could be emitted from an LED or a lamp such as a cold cathode fluorescent tube (CCFT) or similar. This pump light is transmitted through the base substrate 12 and into the fluorescent dye doped polymer pixels 10 which are applied to the front face of the base substrate 12.

The transmission of this light through to the pixels 10 can be controlled by a modulator 14, such as a liquid crystal modulator.

Figure 2:
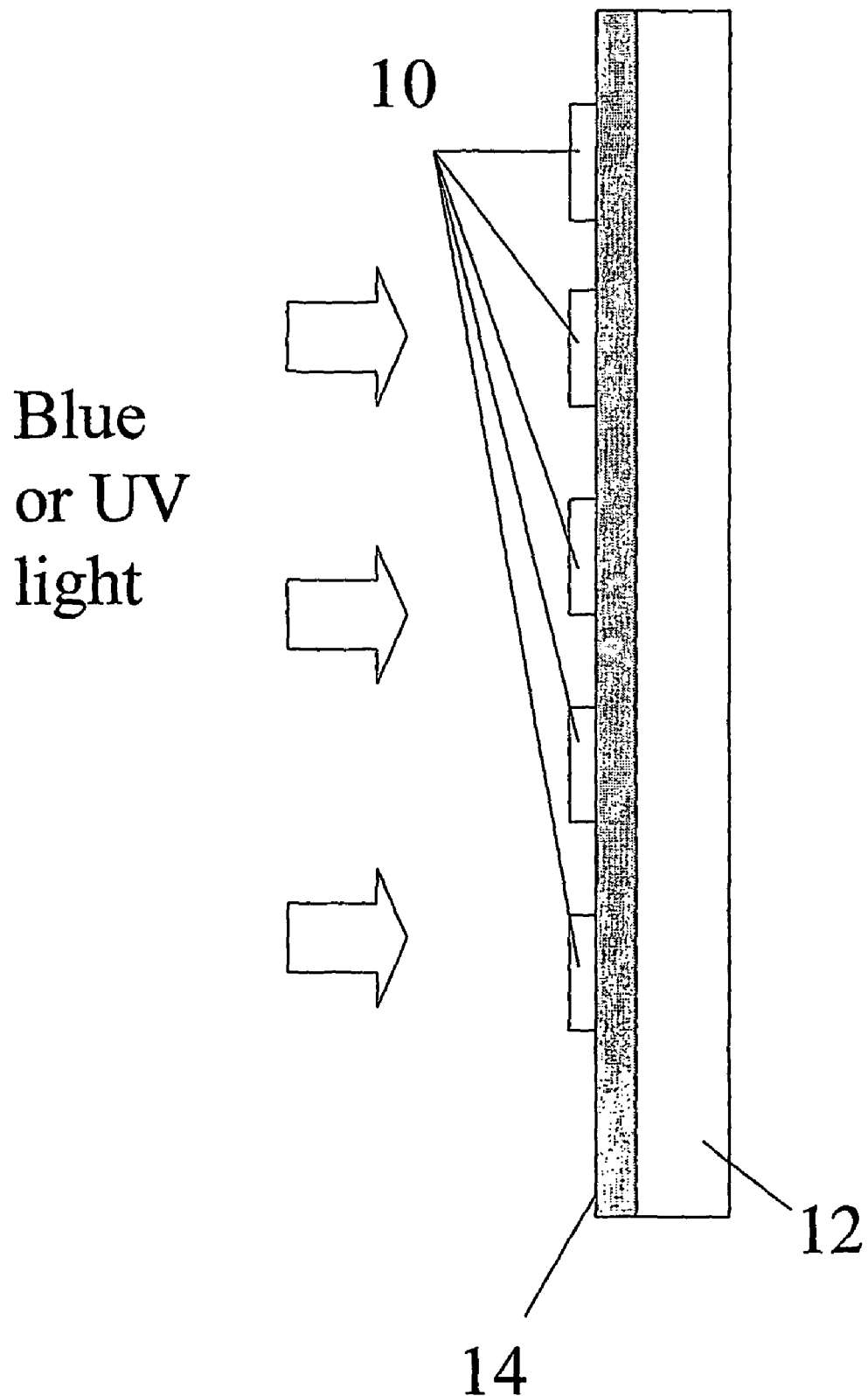
FIG. 2 shows a display wherein the fluorescent dye doped polymer pixels are applied to the rear face of a base substrate, such that the modulator is located in front of the pixels. In both cases, the pixels could be a combination of fluorescent dye doped polymers and phosphorescent materials.

The display shown in FIG. 2 differs from that as shown in FIG. 1 as the modulator is located in front of the pixels as opposed to FIG. 1 where the modulator is located behind the pixels. This alternative arrangement is advantageous in that the pixels have a greater degree of protection that those shown in the arrangement shown in FIG. 1.

There are however associated differences in the quality of the image produced by these alternative displays. The display as shown in FIG. 1, where the pixels 10 are applied to the front of the base substrate 12, (and where the modulator 14 is located behind the pixels 10), has advantages particularly with respect to the parallax error.

There will be improved viewing of such a display, especially from a distance, when compared to the image produced by the display of FIG. 2 where the modulator is located in front of the pixels. The arrangement of the modulator and the pixels in the display shown in FIG. 2 has a more restricted field of view of the display.

A quality image is obtained especially when viewed normal to the plane of the display or "straight on".

Figure 3:
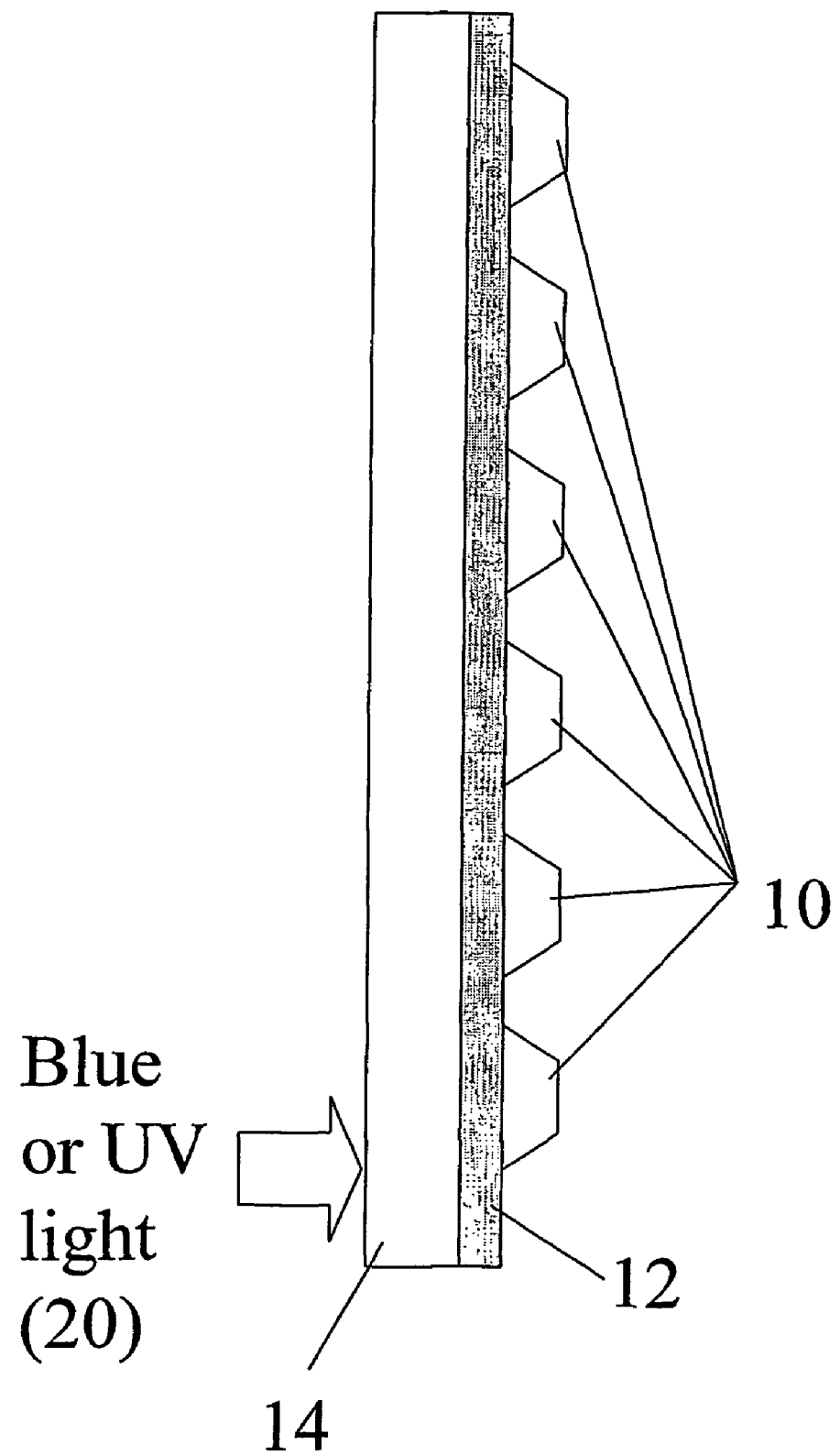
FIG. 3 shows a display wherein the base substrate contains both fluorescent and phosphorescent material, with a liquid crystal modulator controlling the emission of light from the pixels.

The display shown in FIG. 3 has light supplied at a defined point by a pumping source 20. The introduction of light by this pumping source may be modulated (modulator not shown). The pump source may be light sourced from an LED which emits blue or ultraviolet light. The emission spectrum of the light source is chosen to overlap with the absorption spectrum of the dye doped into the polymer. In this example the substrate contains both fluorescent and phosphorescent material. The phosphorescent material allows light to be stored and re-emitted in the absence of a back-light or other pump source.

The emission of light by the phosphorescent material can in turn be further modulated. The light which is emitted from the phosphorescent material can be used to pump the fluorescent dyes contained within the pixel.

In all cases, the pixels shown may be composed of polymer containing red, blue or green dyes or a combination thereof.

One aspect of the present invention provides a fluorescent dye doped polymer system, which produce highly efficient photoluminescence. The ultra-violet (UV) and visible region of the optical spectrum excite (or "pump") the fluorescent dyes. These pump sources can be natural or artificial light such as LEDs, CCFTs or similar. Once excited, the dyes relax by emitting light. This emission of light can be modulated. The light emitted by the dye is of a longer wavelength than the ultra-violet (UV) and/or visible light (from the sun or artificial sources) which excites the dyes. Generally the emitted light is in the visible or infrared part of the optical spectrum.

Selection of the appropriate fluorescent dyes to be incorporated into the polymer host material allows a comprehensive range of visible colours to be produced.

The production of such a complete spectrum of colours as required for modulated displays is typically achieved using red, green and blue (RGB) colours (the primary colours). A combination of these can be used to produce any colour. This is achieved via the positioning on a substrate of three illumination points of dimensions appropriate to the desired resolution. Each illumination point will be a dye doped polymer of either red, green or blue emission. The combination of the three pixels or dots or microlenses is often termed a "pixel".

Alternatively, a pixel can be a singular point of light.

White light or an infinite colour spectrum can be achieved by suitable colour mixing of the light from the three primary elements. This colour mixing is achieved either via electronic or electromechanical modification means, with the method chosen being related to the intended use and size of the display.

The host material into which the dye is incorporated can take many forms, though in many instances it is an optical waveguide structure. The waveguide can be either in the form of an optical fibre, a flat sheet panel, a thin film or a surface of any defined shape.

The dye-doped polymer pixel can also be a dye-doped polymer dot. This dot can take the form of a localised volume of the dye-doped polymer. The shape of this volume can be spherical or moulded to a shape suited to the efficient capture of light for excitation of the dye and effective display of the fluorescent light.

Dots as described above can be printed using volume production methods. These may include modifications of what have become known as "inkjet" printing techniques.

An alternative means of applying these dots to a substrate is screen printing.

A further alternative is multi-shot moulding.

Further methods of applying dot-like amounts of the dye doped polymer to a substrate use polymer materials which would be of a chosen viscosity selected such that the composition or the physical conditions of the material can be controlled. The material temperature or pressure that makes the dye doped polymers printable can also be varied. Further different nozzles may be selected, with these having an outlet aperture ranging in size from microns through to centimetres.

The nozzle and polymer delivery system may be of such a design that different coloured polymers can be deposited either simultaneously or on alternative passes of the nozzle over the base substrate or media upon which the dots are to be applied. For instance, the nozzle may be chosen in order that red, green and blue polymer dots can be deposited in very close physical proximity to each other, this producing the effect that the display is emitting white light.

The base substrate or media onto which the dots are applied could include but is not limited to; a polymer with a waveguide function, glass, quartz and transparent paper, such as tracing paper.

Further, the base substrate could also be profiled. The profiling of the surface so that it is not smooth prevents or reduces the tendency of the deposited polymer to spread across the surface. This would reduce or avoid any smudging of the polymer when it is applied to the base substrate.

Further, the characteristics of the profiled surface could be intentionally selected so as to control the precise shape of the polymer dots that are printed on the surface. For example, the shape of the profiling could be hexagonal, with small ridges running across so that the area could be divided into three into which the printing technique would deposit red, green and blue polymers. As mentioned above, such a combination of dyes would potentially allow any colour to be produced.

Alternative shapes and ridge patterns could be profiled onto the surface of the substrate so as to allow for specific coloured polymers to be combined into a user-defined pattern.

The polymer substrate could alternatively assume a moulded shape. In this case, the actual pixels would be formed not by fibre tips or dots but as an area of small pixels formed by the tips of pre-moulded pegs or microlens structures.

These pegs or microlenses would be of a shape and size which optimises the collection of light. For example, the pegs or microlenses could be tapered or of a conical shape from base to tip. This would allow the pump light to adequately illuminate the sides of the pegs or microlenses, with the shape serving to act as a conduit of focusing profile. In this way the generated light could be focused towards the tip of the peg or microlense so as to improve the brightness emitted at the tip of the peg or microlense.

The moulded polymer could be either coloured or colourless. For example, if the moulded polymer was to be blue in colour, the effect would be to have the moulded form collect light over a considerably enhanced area, this leading to improved efficiency of blue light generation. Other colours could be applied to the tip of the blue polymer so as to form the red and green tips which are necessary in addition to the blue tips for the generation of white light.

If colourless moulded pegs or microlenses are chosen, then the red, green and blue tips would be created by depositing onto the tips of the pegs or microlenses tips a controlled amount of suitably dyed polymer.

The substrate whether of profiled transparent sheet or moulded pegs or microlenses could be of a very large surface area. Various sized arrays would be fabricated by cutting from the large area of substrate sub-sections that would form the backlight for the display of a chosen size.

As a variation to the moulded backlight, the individual coloured pixels could be created by a multiple shot moulding process, with one shot for each colour. In this case, the pixels would be of the same shape (i.e. the mould pattern) but in each shot a different coloured pixel would be moulded.

Displays of this design of backlight could be capable of day and night time illumination without requiring a direct electrical power source. This would be achieved by combining or additionally adding the fluorescent dye-doped polymers with phosphorescent materials.

The phosphorescent material would be selected such that it absorbs ambient light during daytime, or when exposed to other ambient lighting conditions, storing this light in the long upper state.

In low ambient light conditions or in the absence of ambient light, the phosphorescent decay would be used in one of two ways; to stimulate or pump the fluorescent dyes which were also present in the polymer. In the absence of an ambient light source, such as during the night, the light supplied to pump the dyes would come directly from the phosphorescent materials alone. In this latter instance, the display would be monochrome and would be of the colour of the phosphorescence emission.

In order for the combined phosphorescent/fluorescent combination to be most efficient, the absorption and emission characteristics of the phosphorescent material would be chosen so as to respectively;
 (i) absorb the maximum amount of ambient light and,
 (ii) efficiently transfer the stored energy to the absorption band of the fluorescent material.

A higher dye concentration must be used in the polymer when it is in dot, peg or microlens form.

Such an embodiment of the present invention is based on several important factors;
 (i) The fluorescent light can be generated without the need for a direct electrical power source. Preferably ambient light is used, thus saving energy. An alternative reduced power option is where the dyes are chosen to be pumped directly by an ultraviolet or blue illumination source.
 (ii) That the direct pumping of the dye-doped pixels and obviation of the need for mosaic filters further means that the CCFT does not require a phosphorescent coating. This inturn results in improved efficiency of the proposed optical system in that the pump photons avoid a conversion step from UV to white light via impact with the fluorescent layer in order to be filtered to an appropriate colour by the mosaic filter. In this instance the pump photons directly excite the fluorescent dye leading to more direct and efficient light generation. Use of the UV emission directly to illuminate the dyes is a significant step beyond the current art.
 (iii) That the illumination source could be an LED is also a significant improvement. LEDs are mass producible low cost sources. Further, the LED could be modulated with controllable aspect ratio. This aspect ratio could chosen so as to enable further significant power reductions.
 (iv) Significantly, the use of LEDs means that the pump source need not use mercury as per CCFTs. This is a significant step with environmental impact in the fabrication of new, and disposal of old display units.

In either case of UV lamp or LED excitation of the dye-doped polymers, the pump light is coupled into the dye material. Improvements to the efficiency of collection and therefore of the emission from the dye is that the edges of the substrate closest to the pump source could be profiled so as to improve the collection of the pump light.

Further, the choice of UV transmitting substrate will also contribute efficiency gains via the improved excitation of dye-doped polymer pixels. This would be specifically effected as a result of the improved transmission and propagation of the light through the substrate to the polymer dots, pegs or microlense pixels.

Side illumination of the substrate also results in reduced coupling of the ultra-violet pump light through the plane of the display area to the viewing side. This significantly reduces any risk of optical damage to a viewer.

The excitation of the substrate could be from one side. Alternatively, excitation may be from two, three or four sides in order to improve the uniformity of the illumination across the display plane as the display area is scaled upwards. Uniformity will also be improved via profiling of the substrate.

Upwards scalability of the display area may require rear illumination in order to achieve uniform emission and display brightness. In this case, obviation of any ultra-violet pump light being transmitted through the plane of the display towards a viewer could be achieved by deposition of an ultra-violet absorbing layer on the front face of any device. This may also be used as a scratch resistant layer to protect the device.

Any fluorescent light generated by the pumping or excitation within the dyes is collected within the optical waveguide structure which could be in dot, peg or microlense form. The lights would be amplified as a result of the guided propagation within the structure.

It is a feature of the display that the ratio between the intensity (per unit area) of the fluorescent light emitted at the edge or the end of the pixel and the intensity of the ambient light (per unit area) remains constant, i.e. the contrast of displays is independent of variable conditions such as lighting conditions. This will have the effect of maintaining display brightness when used outdoors or following any significant increase in ambient light levels.

The principal steps for ambient light absorption and fluorescent light generation by the dye polymer optical waveguide structure are;

a) Ambient light absorption by the fluorescent dye or absorption by the dye of light from the LED or CCFT.
b) Fluorescent light emission by the dye
c) Scattering of fluorescent light out of the waveguide or polymer structure
d) Total internal reflection of the fluorescent light
e) Coupling out of fluorescent light from the waveguide or polymer structure at a discontinuity or at the tip of a peg or microlens.

The fluorescent dye doped polymer based displays give maximum performance in terms of brightness and colour definition via optimisation of the steps above.

The technology of the present invention has the following unique properties:

1) Low optical absorption for polymer host. This ensures that the fluorescent dye molecules are efficiently excited by the pump light whether this is solely ambient or synthetic or a combination of thereof and that no losses occur due to absorption of ambient light by the polymer host.

2) Optimised substrate geometry for maximum pump light collection. This ensures that the pump light available for excitation, is 100% absorbed by the dye molecules deposited across the display area.

3) High quantum efficiency dyes are used for light generation. The fluorescent dyes selected have maximum quantum efficiency (approaching 100%).

4) Matching of absorption spectrum of the fluorescent dye(s) with the energy spectrum of pump light source(s). Consideration of the pump light sources and their energy spectra, and also an extensive range of fluorescent dye absorption spectra. This is to ensure that for a particular display application, the maximum available light can be utilised for excitation.

5) Multi-component dye mixtures for energy cascade emission using binary and tertiary dye systems. These systems absorb pump light effectively, not only in the visible region but also in the UV region. The energy is transferred (by cascading effect) to the longer wavelength thus utilising more energy for excitation from the ambient light.

6) Narrow or broad band absorption spanning several wavelength bands. The present multi-component dye mixtures afford the possibility of tailored narrow or broad band absorption. The absorption can be tailored specifically to the spectrum of the available ambient light source and the desired application, e.g. for a variety of outdoor or indoor displays.

7) Narrow band emission, spanning several wavelength bands. By selecting the appropriate dye(s), the polymers can provide bright, narrow band light emission over a wide spectral range spanning from UV through visible to the IR. Again this can be tailored to be application dependent.

8) Optimisation of dye(s) compatibility with the polymer host. This compatibility is important, especially in the specific area of minimising the quenching of dye efficiency by the polymer host.

9) Minimum loss of fluorescent light by absorption and scattering. Polymers have a high refractive index for minimising scattering loss and low absorption coefficients for the wavelengths of the emitted fluorescent light. The scattering loss is further reduced by application of cladding, using low refractive index polymers which may also protect the device.

10) Full hemispheric field of view. The polymer waveguide ends are optimised for full hemispheric field of view. This is particularly advantageous for display applications. The benefit would be the obviation of the severe angular dependence typical of LCD laptop displays.

11) Use of ferroelectric liquid crystal shutters. Application of bistable liquid crystal optical shutter based on ferroelectric liquid crystal mixtures.

In order to modulate the intensity of the red, green or blue light emitted at the end of each dye doped polymer optical pixel, a rectangular x-y array of ferroelectric liquid crystal modulators is placed at the front of the dye doped pixels, one cell at each dye doped pixels (one cell per pixel).

The advantage of using bistable ferroelectric liquid crystal modulators is twofold: firstly, the contrast between off and on, i.e. the contrast between the high and low transmittance state is much greater than it is in the case of nematic liquid crystal based modulators. Secondly, due to the bistability, the electrical power consumption associated with the driving of the pixel array can be reduced. This reduction arises as a result of the need to apply the driving voltage across the pixel only if the information content of the particular pixel (ON or OFF) is to be changed and not to maintain its operation.

The properties described above result in higher light emission per unit area than for any commercial light emitting polymer and lower power consumption than required by existing displays for a target brightness.

Use of twisted nematic liquid crystals, normally white, can be scalable in size from microns through to centimetres of physical size. The modulator pixels could be of various shapes including, but not limited to squares or shapes that match the shapes of the dye-doped polymer pixels.

Target performance figures for modulators of this type are; contrast ratios of 200:1 and optical transmissions of >70%.

As a variation of this, the dye doped polymer and the liquid crystal display could be fabricated on opposite sides of the same transparent substrate. Such a full colour display has five unique points which distinguish it:

1) Minimal to zero electrical power required for the light source, (both CRT and LCD displays have large electrical power consumption).

2) Sunlight readability or viewability i.e. an ability to operate in bright ambient light conditions—such as outdoors.

3) Full hemispheric field of view (FOV) i.e. the ability to view the display from all angles not just from a narrow "cone" as is the case with many LCD screens.

4) Constant contrast over a wide range of ambient light levels, including outdoor lighting conditions. i.e. as the ambient light brightens or darkens, the ability to see the image on the screen remains unchanged.

5) Simplicity of construction to produce displays with reduced fabrication costs.

6) Use of illumination sources such as LEDs which do not require Mercury in the gas discharge therefore removing major environmental considerations in the fabrication of new and disposal of old display units.

Full colour displays produced by the present invention will consist of an array of fluorescent dye doped polymer optical pixel elements. These will produce red, green and blue (RGB) light. This will be integrated to an array of liquid crystal light modulator for the video signal.

Ambient light (natural or artificial) and or UV light from lamps or LEDs will excite red, green, and blue fluorescent dye molecules embedded in the polymer pixels. The coloured light is created at the individual pixels. This eliminates the need for colour filters as would be the case for traditional LCDs and contributes to the easier fabrication listed above.

Video Modulation

Modulation of the light from the assembly of pixels is required in order to create an active, moving display (such as would be recognised from a TV screen).

In order to change or "modulate" the intensity of the RGB light (i.e. produce a video display) a rectangular x-y array of liquid crystal modulators is positioned in front of the coloured x-y pixel array.

The modulators are individually matched to the x-y array of RGB pixels. The intensity from the individual RGB polymer pixels can be modulated creating the full colour display.

The modulator can either be conventional nematic liquid crystals or bistable ferroelectric liquid crystals.

In the embodiment where the excitation is solely from ambient light, the only electrical power required is the minimal supply for the modulating shutter array. The reduction of power requirement will be of enormous benefit.

The following elements should be considered in the production of such a dynamic, addressable colour display:

a) Optimise the geometrical relationship of the dye doped polymer optical pixels.
b) Optimise the substrate to maximise the collection of the pump light and transmission of the pump light through the substrate to the pixels.
c) Optimise the pixel geometry. This will be a 200×50 x-y array of RGB pixels, made of dye doped polymers.
d) Construction of a video rate driving circuitry for the liquid crystal modulators
e) The characterisation of the operations of the display device.
f) Evaluation of display parameters in terms of brightness, contrast, viewing angle and switching speed.

Consideration of the features should lead to the production of a unique visible display. Using dye-doped polymers technology, the display will be unique in that it requires no electrical, or a reduced power source for light generation.

As well as being primarily used in the display and telecommunications markets, the technology of the present invention may be further adapted to be used in the following areas; interior lighting, lighting areas that are hazardous, water features—such as fountains/spas/pools, marine applications, borescopes, optical sensors, military communications, wearable computers and remote control networks.

The invention claimed is:

1. A back-lighting source for use in the illumination of a display screen, the back-lighting source comprising a fluorescent dye doped polymer material and a phosphorescent material, said phosphorescent material being modulated such that the release of light can be controlled therefrom and wherein the absorption spectrum of the fluorescent dye contained within the polymer are wavelength matched with the energy spectrum of an LED which acts as a pumping source.

2. A back-lighting source as claimed in claim 1 wherein the phosphorescent material is inorganic material.

3. A back-lighting source as claimed in claim 1, wherein the fluorescent dye is selected from the group consisting of aromatic hydrocarbons and aromatic heterocarbons.

4. A back-lighting source as claimed in claim 1, wherein the phosphorescent material is selected from the group consisting of zinc sulphides and alkaline earth aluminates.

5. A back-lighting source as claimed in claim 1, wherein the LED emits blue light.

6. A back-lighting source as claimed in claim 1, wherein the LED emits ultraviolet light.

* * * * *